(12) United States Patent
Kuehner et al.

(10) Patent No.: US 12,080,164 B2
(45) Date of Patent: Sep. 3, 2024

(54) SYSTEMS AND METHODS FOR ASSISTING A VEHICLE DRIVER AT A ROUNDABOUT

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 56 days.

(21) Appl. No.: 17/974,964

(22) Filed: Oct. 27, 2022

(65) Prior Publication Data

US 2024/0144819 A1 May 2, 2024

(51) Int. Cl.
*B60W 30/08* (2012.01)
*G08G 1/0967* (2006.01)
*G08G 1/16* (2006.01)
*B60Q 9/00* (2006.01)

(52) U.S. Cl.
CPC .......... *G08G 1/0967* (2013.01); *G08G 1/166* (2013.01); *B60Q 9/00* (2013.01)

(58) Field of Classification Search
USPC .... 340/436, 438, 446, 463–464, 470, 539.1, 340/539.22, 691.6, 692, 7.55
See application file for complete search history.

(56) References Cited

U.S. PATENT DOCUMENTS

| | | | |
|---|---|---|---|
| 9,663,004 B2* | 5/2017 | Perrin | B60N 2/2821 |
| 11,004,336 B2* | 5/2021 | Choi | G08G 1/096775 |
| 2007/0150182 A1 | 6/2007 | Okusa | |
| 2015/0024853 A1* | 1/2015 | Zedell, Jr. | G07F 17/3241 463/46 |
| 2016/0335923 A1* | 11/2016 | Hofmann | G01C 21/3819 |
| 2017/0102245 A1* | 4/2017 | Iwata | G01C 21/3629 |
| 2017/0103653 A1* | 4/2017 | Satomura | G08G 1/04 |
| 2020/0363228 A1 | 11/2020 | Nojiri et al. | |
| 2021/0014604 A1* | 1/2021 | Kobayashi | G10K 11/20 |
| 2021/0206370 A1* | 7/2021 | Lechner | B60W 30/18145 |
| 2022/0379902 A1* | 12/2022 | Deshpande | G08G 1/09623 |

OTHER PUBLICATIONS

A. Liszewski. "Ford is Testing In-Car Sound Effects to Alert Drivers to Hazardsd Outside the Vehicle." Gizmodo. Feb. 17, 2022. https://gizmodo.com/ford-is-testing-in-car-sounds-to-alert-drivers-to-hazar-1848554184.

* cited by examiner

*Primary Examiner* — Daniel Previl
(74) *Attorney, Agent, or Firm* — Christopher G. Darrow; Darrow Mustafa PC (57) ABSTRACT

Systems and methods for assisting a vehicle driver at a roundabout are disclosed herein. One embodiment determines that a vehicle is approaching and is within a predetermined distance from a roundabout and plays, in a passenger compartment of the vehicle in response to the determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, a correct direction in which to traverse the roundabout to assist the driver with regard to the roundabout being a right-hand-traffic (RHT) roundabout or a left-hand-traffic (LHT) roundabout.

20 Claims, 5 Drawing Sheets

FIG. 5

SYSTEMS AND METHODS FOR ASSISTING A VEHICLE DRIVER AT A ROUNDABOUT

TECHNICAL FIELD

The subject matter described herein generally relates to vehicles and, more particularly, to systems and methods for assisting a vehicle driver at a roundabout.

BACKGROUND

Switching from driving a vehicle in right-hand traffic (RHT) to driving in left-hand traffic (LHT) or vice versa can be challenging and even pose a safety risk to tourists and business travelers. This problem is particularly pronounced at roundabouts because traffic flows in a counterclockwise direction in RHT roundabouts but flows in a clockwise direction in LHT roundabouts. Driver errors at roundabouts can readily result in accidents. For example, a driver unaccustomed to RHT or LHT might enter the roundabout in the wrong direction, leading to a serious collision with opposing traffic.

SUMMARY

An example of a system for assisting a vehicle driver at a roundabout is presented herein. The system comprises a processor and a memory storing machine-readable instructions that, when executed by the processor, cause the processor to determine that a vehicle is approaching and is within a predetermined distance from a roundabout. The memory also stores machine-readable instructions that, when executed by the processor, cause the processor to play, in a passenger compartment of the vehicle in response to determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, the correct direction in which to traverse the roundabout to assist the driver with regard to the roundabout being a right-hand-traffic (RHT) roundabout or a left-hand-traffic (LHT) roundabout.

Another embodiment is a non-transitory computer-readable medium for assisting a vehicle driver at a roundabout and storing instructions that, when executed by a processor, cause the processor to determine that a vehicle is approaching and is within a predetermined distance from a roundabout. The instructions also cause the processor to play, in a passenger compartment of the vehicle in response to determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, the correct direction in which to traverse the roundabout to assist the driver with regard to the roundabout being a RHT roundabout or a LHT roundabout.

Another embodiment is a method of assisting a vehicle driver at a roundabout. The method includes determining that a vehicle is approaching and is within a predetermined distance from a roundabout. The method also includes playing, in a passenger compartment of the vehicle in response to the determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, the correct direction in which to traverse the roundabout to assist the driver with regard to the roundabout being a RHT roundabout or a LHT roundabout.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations. Also, elements in the drawings are not necessarily drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

In various embodiments described herein, a roundabout assistance system in a vehicle provides the driver of the vehicle with intuitive directional sound cues to assist the driver in entering a roundabout in the correct direction, in accordance with whether the roundabout is a right-hand-traffic (RHT) roundabout or a left-hand-traffic (LHT) roundabout. As those skilled in the art are aware, in a region that observes a RHT convention (e.g., the U.S.), vehicles drive on the righthand side of a two-way roadway, and traffic in roundabouts flows in a counterclockwise direction. In a region that observes a LHT convention (e.g., the UK), vehicles drive on the lefthand side of a two-way roadway, and traffic in roundabouts flows in a clockwise direction.

In one embodiment, the roundabout assistance system determines that the vehicle is approaching a roundabout and that the vehicle is within a predetermined distance from the roundabout. In response to those two conditions being met, the system plays, in the vehicle's passenger compartment, an audio prompt in a particular manner that imparts directionality to the audio prompt, as perceived by the driver. The directionality of the audio prompt (i.e., from left to right or from right to left, from the driver's perspective) indicates, to the driver, the correct direction in which to traverse the upcoming roundabout (i.e., the direction in which traffic flows in the roundabout, according to the local convention). This helps the driver to avoid confusion and mistakes due to the roundabout being governed by an unfamiliar traffic convention (RHT or LHT).

In some embodiments, the directionality of the audio prompt is created by panning the audio prompt from one or more speakers on the left or right side of the vehicle to one or more speakers on the opposite side of the vehicle over a relatively short period (e.g., from 0.5 s to 2 s). The driver perceives this as the audio prompt moving from one side of the vehicle to the other, the direction of movement indicating to the driver the direction in which traffic flows in the detected roundabout and, thus, the correct direction in which to traverse the roundabout safely.

In some embodiments, the audio prompt includes virtual traffic sounds (e.g., road/tire noise of one or more vehicles). In those embodiments, the virtual traffic sounds can be recorded sounds from real traffic, or they can be artificially synthesized traffic sounds that mimic the sounds of vehicle traffic. One advantage of virtual traffic sounds, in this context, over more generic sounds (e.g., beeps, tones, etc.) is that the virtual traffic sounds intuitively suggest to the driver what the panned audio prompt is intended to communicate: the direction in which traffic flows in the roundabout (from left to right, in RHT, or from right to left, in LHT).

In some embodiments, the audio prompt is played repeatedly (a plurality of times) as described above (panned from one side of the vehicle to the other each time it is played and subsequently repeated) until the roundabout assistance system detects that the vehicle has entered (merged into) the roundabout. In a variation of these embodiments, the system increases the volume of the audio prompt one or more times as the audio prompt is repeatedly played with the panning described above. For example, in one embodiment, the system initially plays the audio prompt softly and then linearly or nonlinearly increases the volume as the audio prompt is repeated until a predetermined maximum volume is reached or the system detects that the vehicle has entered the roundabout, whichever occurs first.

In some embodiments, the roundabout assistance system automatically determines whether the upcoming roundabout is a RHT roundabout or a LHT roundabout based on knowledge of the geographical region in which the vehicle is currently being operated. The system can ascertain the geographical region from a geographical-region configuration option in the vehicle or from an onboard positioning system, depending on the embodiment.

Figure 1:
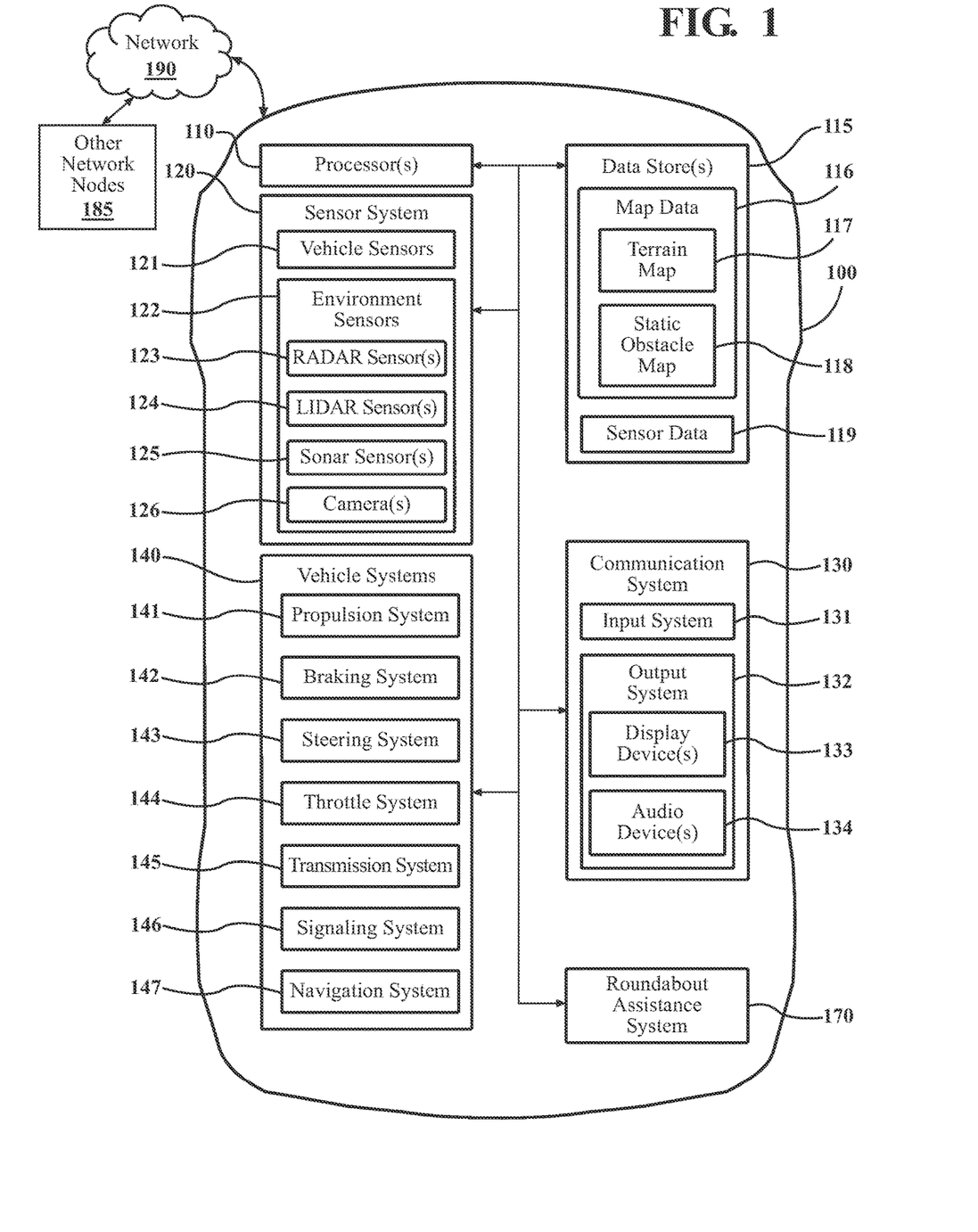
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. As used herein, a "vehicle" is any form of motorized transport. For example, in some embodiments, the vehicle 100 is an automobile. The vehicle 100 can include a roundabout assistance system 170 or capabilities to support or interact with the roundabout assistance system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including roundabout assistance system 170. While the various elements are shown as being located within the vehicle 100 in FIG. 1, it will be understood that one or more of these elements can be located external to the vehicle 100 or be part of a system that is separate from vehicle 100. Further, the elements shown may be physically separated by large distances.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

As shown in FIG. 1, in some embodiments, vehicle 100 includes a sensor system 120. Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. In some embodiments, vehicle 100 includes environment sensors 122 such as RADAR sensor(s) 123, Light Detection and Ranging (LIDAR) sensor(s) 124, sonar sensor(s) 125, and/or camera(s) 126.

As also shown in FIG. 1, vehicle 100 can include a communication system 130 that includes an input system 131 and an output system 132. As discussed further below, roundabout assistance system 170 uses audio device(s) 134 to play the directional audio prompts discussed above that indicate to the driver of a vehicle 100 the correct (safe) direction in which to traverse an upcoming roundabout.

In some embodiments, vehicle 100 can communicate with one or more other network nodes 185 (servers, other vehicles, or infrastructure systems) via a network 190. In some embodiments, network 190 includes the Internet. In communicating directly with other vehicles, vehicle 100 can employ technologies such as dedicated short-range communication (DSRC) or Bluetooth® Low Energy (BLE). In communicating with servers or infrastructure systems (traffic signals, roadside units, etc.), vehicle 100 can employ a technology such as cellular data (Long-Term Evolution (LTE), 5G, 6G, etc.).

Figure 2:
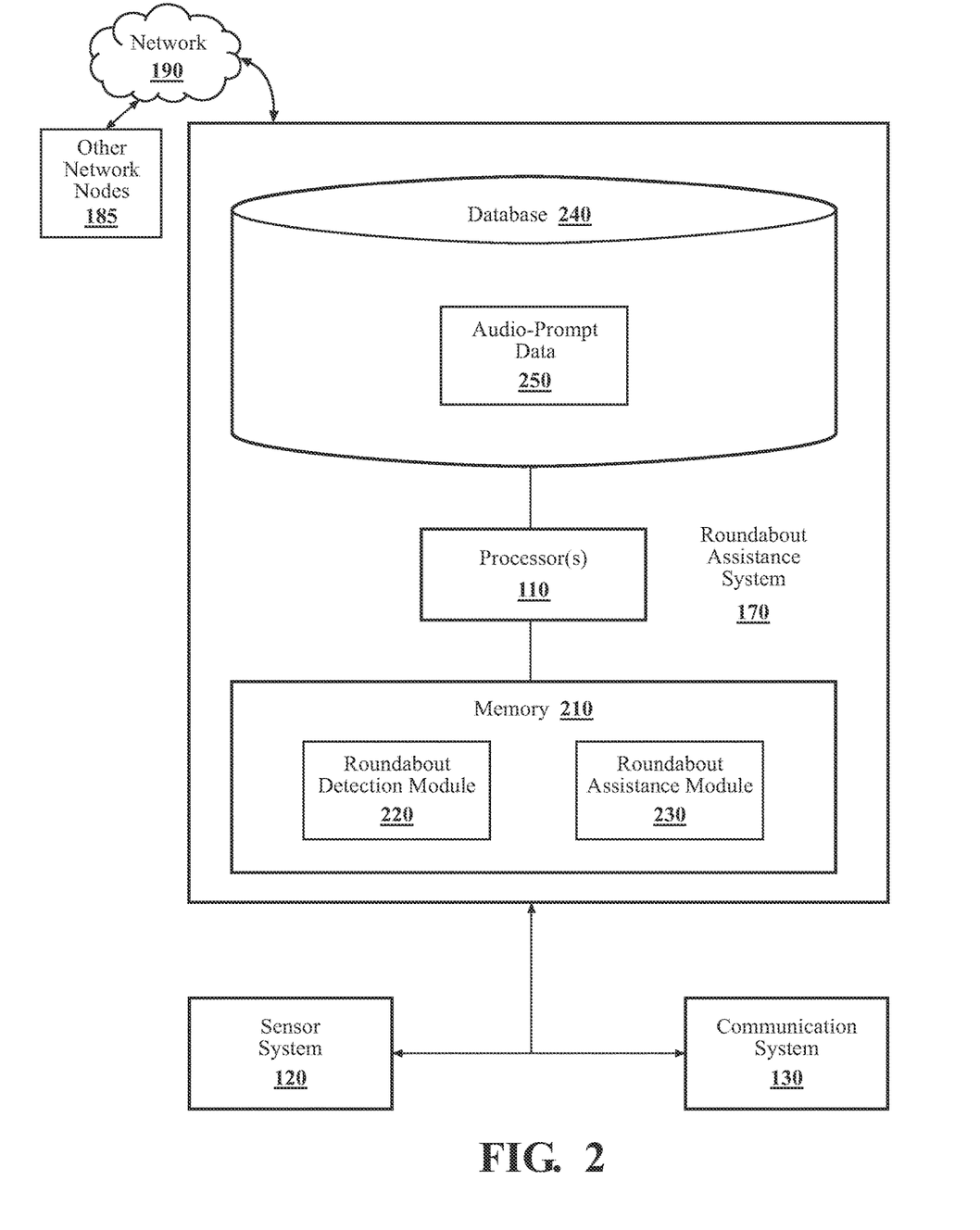
FIG. 2 illustrates one embodiment of a roundabout assistance system.

FIG. 2 is a block diagram of a roundabout assistance system 170, in accordance with an illustrative embodiment of the invention. Roundabout assistance system 170 is an optional feature in vehicle 100 that a driver or other user can enable or disable via the vehicle's settings/options user interface. Rental car companies, in particular, might choose to enable, by default, roundabout assistance system 170 in vehicles rented to tourists and business travelers from regions that observe a different traffic convention (RHT or LHT) from that in the local area.

Roundabout assistance system 170 is shown as including one or more processors 110 from the vehicle 100 of FIG. 1. Accordingly, the one or more processors 110 may be a part of the roundabout assistance system 170, the roundabout assistance system 170 may include one or more processors that are separate from the one or more processors 110 of the vehicle 100, or the roundabout assistance system 170 may access the one or more processors 110 through a data bus or another communication path.

In the embodiment of FIG. 2, the roundabout assistance system 170 includes a memory 210 that stores a roundabout detection module 220 and a roundabout assistance module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein. In performing its various functions, roundabout assistance system 170 can store various kinds of data such as audio-prompt data 250. For example, in one embodiment, audio-prompt data 250 includes one or more digital audio files containing virtual traffic sounds. As shown in FIG. 2, roundabout assistance system 170 can communicate and interface with other systems or subsystems of vehicle 100, such as sensor system 120 and communication system 130. In some embodiments, roundabout assistance system 170 can communicate with one or more other network nodes 185 (servers, other vehicles, or infrastructure systems) via a network 190, as discussed above in connection with FIG. 1.

Detection module 220 generally includes machine-readable instructions that, when executed by the one or more processors 110, cause the one or more processors 110 to determine that a vehicle 100 is approaching and is within a predetermined distance from a roundabout. How roundabout detection module 220 makes this determination varies, depending on the embodiment. In one embodiment, roundabout detection module 220 relies on map data 116 and GPS positioning data (refer to FIG. 1). In another embodiment, roundabout detection module 220 relies on information from an infrastructure system (e.g., a roadside unit (RSU)) at or near the roundabout that transmits a wireless message to vehicle 100 informing vehicle 100 that the intersection ahead is a roundabout. In another embodiment, roundabout detection module 220 relies on information obtained from a cloud-based traffic-information server. In yet another embodiment, roundabout detection module 220 detects the upcoming roundabout by analyzing sensor data (e.g., images from camera(s) 126, LIDAR data, etc.) from sensor system 120. As those skilled in the art are aware, LIDAR data provides ranging information enabling roundabout detection module 220, in such an embodiment, to determine when vehicle 100 is within the predetermined distance from the roundabout. The predetermined distance can also vary, depending on the embodiment. In one embodiment, the predetermined distance is about 10 meters. In other embodiments, this distance can be increased somewhat to give the driver of vehicle 100 more time to perceive, via the audio prompt, the direction of traffic flow in the upcoming roundabout. Two versions of the scenario roundabout detection module 220 detects, one for RHT and one for LHT, are diagrammed in FIGS. 3A and 3B, respectively.

Figure 3A:
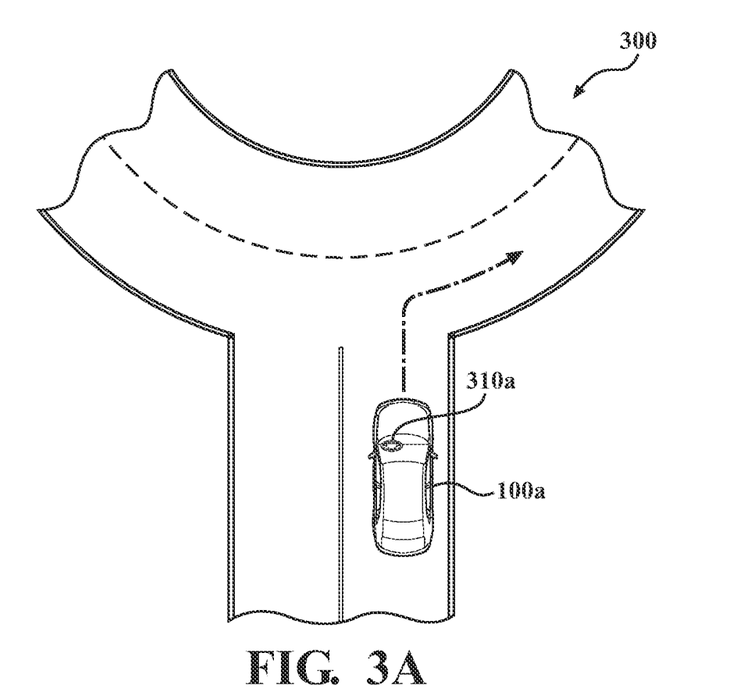
FIG. 3A is a diagram of a vehicle approaching a right-hand-traffic (RHT) roundabout, in accordance with an illustrative embodiment of the invention.

FIG. 3A is a diagram of a vehicle 100 approaching a RHT roundabout 300, in accordance with an illustrative embodiment of the invention. In FIG. 3A, a vehicle 110a is approaching the RHT roundabout 300. For the sake of illustration, vehicle 110a is a left-hand-drive (LHD) vehicle; i.e., its steering wheel 310a is on the left side of the vehicle, from the driver's perspective. A LHD vehicle is the predominant type of vehicle driven in a RHT region. However, more generally, vehicle 110a could be a LHD vehicle or a right-hand-drive (RHD) vehicle. For example, the owner of a RHD vehicle made for the UK market might have his or her vehicle shipped to the U.S., and he or she might drive it in the U.S., a RHT region. As indicated in FIG. 3A, traffic in a RHT roundabout 300 flows in a counterclockwise direction, and vehicles enter the roundabout with a right turn.

Figure 3B:
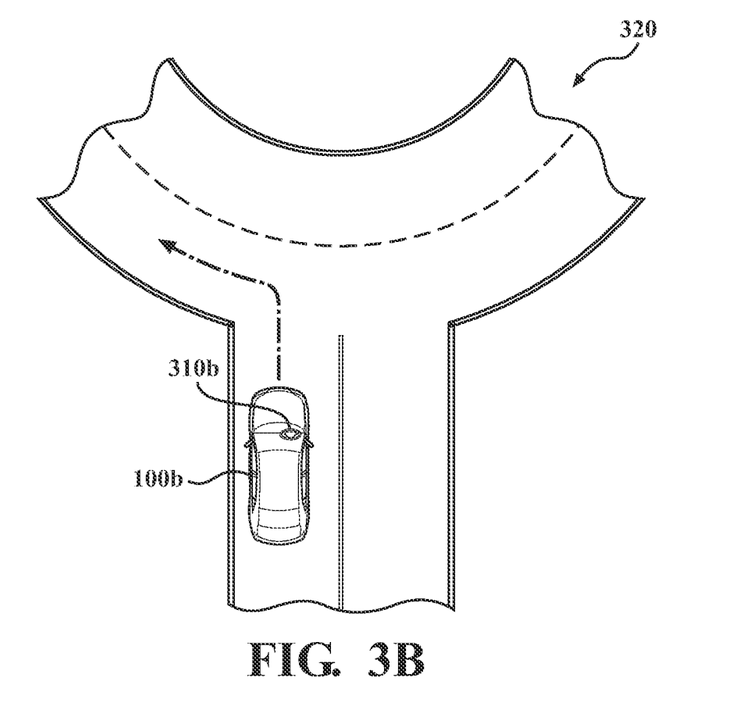
FIG. 3B is a diagram of a vehicle approaching a left-hand-traffic (LHT) roundabout, in accordance with an illustrative embodiment of the invention.

FIG. 3B is a diagram of a vehicle 100 approaching a LHT roundabout 320, in accordance with an illustrative embodiment of the invention. In FIG. 3B, a vehicle 110b is approaching the LHT roundabout 320. For the sake of illustration, vehicle 110b is a right-hand-drive (RHD) vehicle; i.e., its steering wheel 310b is on the right side of the vehicle, from the driver's perspective. A RHD vehicle is the predominant type of vehicle in a LHT region. However, more generally, vehicle 110b could be a RHD vehicle or a LHD vehicle. For example, the owner of a LHD vehicle made for the U.S. market might have his or her vehicle shipped to the UK, and he or she might drive it in the UK, a LHT region. As indicated in FIG. 3B, traffic in a LHT roundabout 320 flows in a clockwise direction, and vehicles enter the roundabout with a left turn.

Referring again to FIG. 2, roundabout assistance module 230 generally includes machine-readable instructions that, when executed by the one or more processors 110, cause the one or more processors 110 to play, in the passenger compartment of the vehicle 100 in response to determining that the vehicle 100 is approaching and is within the predetermined distance from the roundabout, an audio prompt such that the audio prompt is panned from a first speaker on a first side of the vehicle to a second speaker on a second side of the vehicle opposite the first side of the vehicle to indicate, to the driver of vehicle 100, the correct direction in which to traverse the roundabout to assist the driver with regard to the roundabout being a RHT roundabout 300 or a LHT roundabout 320. Two different configurations of roundabout assistance module 230, one for RHT and one for LHT, are illustrated in FIGS. 4A and 4B, respectively.

Figure 4A:
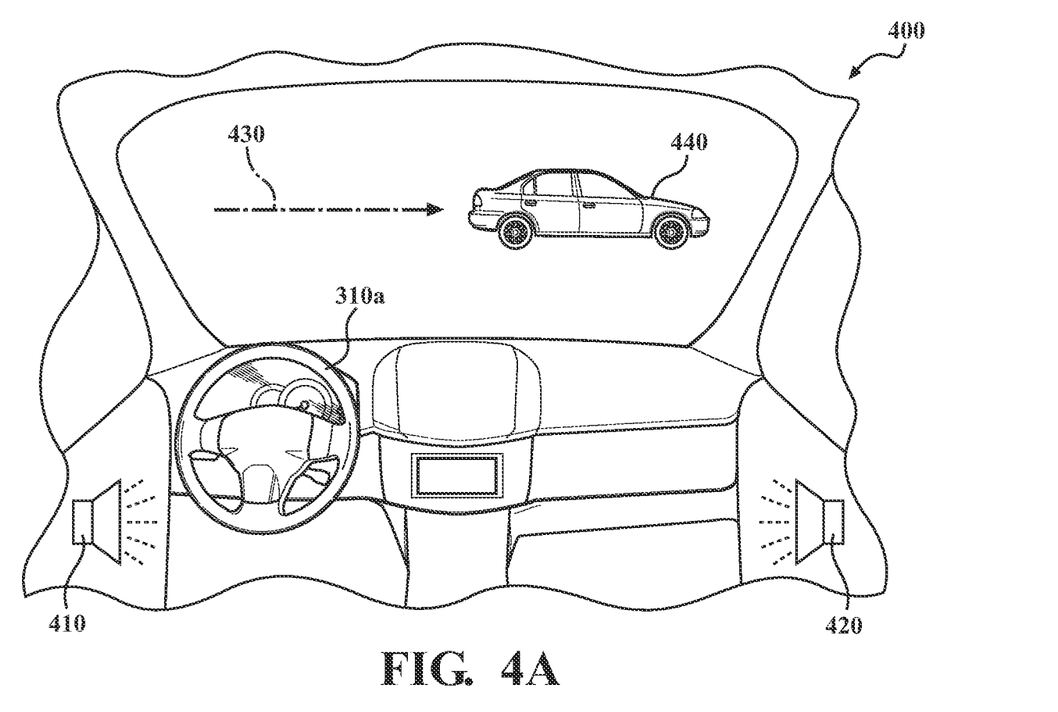
FIG. 4A illustrates a RHT configuration of a roundabout assistance system in a vehicle, in accordance with an illustrative embodiment of the invention.

FIG. 4A illustrates a RHT configuration 400 of a roundabout assistance system 170 in a vehicle 100, in accordance with an illustrative embodiment of the invention. As shown in FIG. 4A, RHT configuration 400 includes a first speaker 410 on the left side of vehicle 100, from the driver's perspective, and a second speaker 420 on the right side of vehicle 100, from the driver's perspective. In one embodiment, the first speaker 410 and the second speaker 420 are mounted in the front doors or side panels of vehicle 100. For example, if vehicle 100 is a LHD vehicle, as depicted in FIG. 4A, first speaker 410 is mounted on the driver side of vehicle 100, and second speaker 420 is mounted on the passenger side of vehicle 100.

Figure 4B:
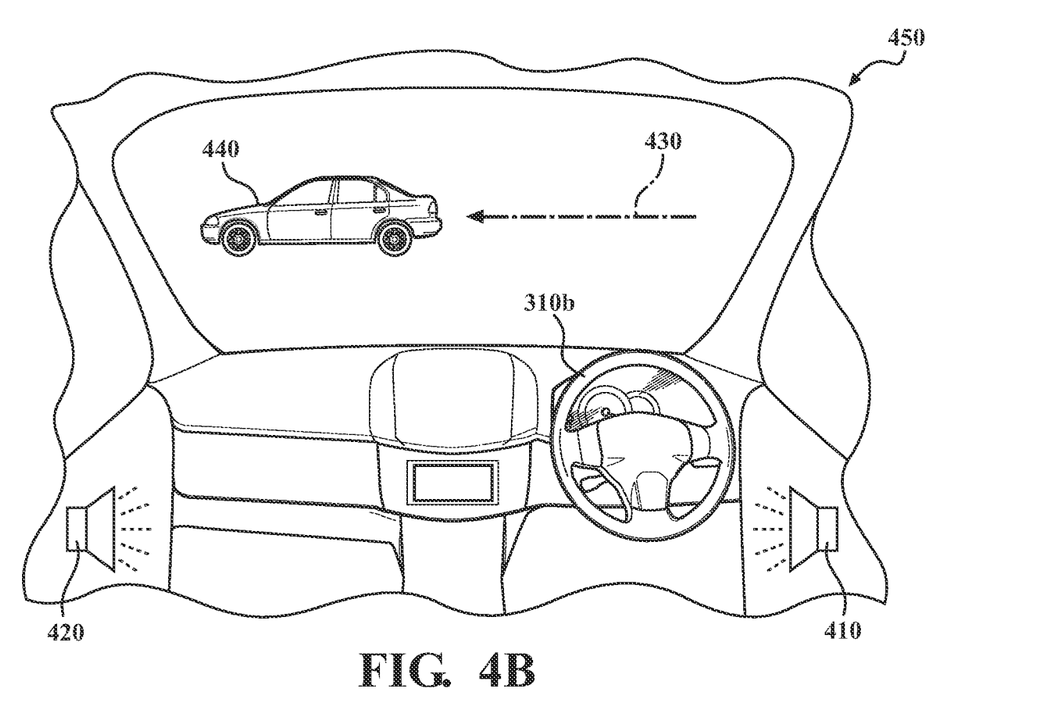
FIG. 4B illustrates a LHT configuration of a roundabout assistance system in a vehicle, in accordance with an illustrative embodiment of the invention.

FIG. 4B illustrates a LHT configuration 450 of a roundabout assistance system 170 in a vehicle 100, in accordance with an illustrative embodiment of the invention. As shown in FIG. 4B, LHT configuration 450 includes a first speaker 410 on the right side of vehicle 100, from the driver's perspective, and a second speaker 420 on the left side of vehicle 100, from the driver's perspective. In one embodiment, the first speaker 410 and the second speaker 420 are mounted in the front doors or side panels of vehicle 100. For example, if vehicle 100 is a RHD vehicle, as depicted in FIG. 4B, first speaker 410 is mounted on the driver side of vehicle 100, and second speaker 420 is mounted on the passenger side of vehicle 100.

It should be noted that RHT configuration 400 and LHT configuration 450 discussed above are not the only possible configurations for a roundabout assistance system 170. For example, in some embodiments, multiple speakers can be deployed on each side of the vehicle to support the use of three-dimensional (3D) audio techniques.

As mentioned above, in some embodiments, the audio prompt that roundabout assistance module 230 plays includes virtual traffic sounds. In other embodiments, the audio prompt includes a different kind of sound (e.g., a beep, a tone, a musical note or phrase, a combination of different sounds, etc.). In FIGS. 4A and 4B, a virtual vehicle 440 is depicted to represent such virtual traffic sounds (the sound of traffic passing in front of the driver in the direction indicated by the arrow in FIG. 4A (left to right) or FIG. 4B (right to left).

In both RHT configuration 400 (FIG. 4A) and LHT configuration 450 (FIG. 4B), roundabout assistance module 230 initially fully pans the audio prompt 430 (e.g., virtual traffic sounds) toward the stereo channel (Left or Right) corresponding to first speaker 410. Over a relatively brief predetermined period (e.g., from 0.5 to 2 s), roundabout assistance module 230 pans the audio prompt 430 fully toward the stereo channel corresponding to second speaker 420. For example, if the duration of the audio prompt is 1 s, the stereo panning would initially be 100% in first speaker 410, approximately 50% in first speaker 410 and 50% in second speaker 420 after 0.5 s (this corresponds to the center position with regard to stereo imaging), and 100% in second speaker 420 by the time the audio prompt terminates after 1 s has elapsed. This time-varying panning of the audio prompt is perceived directionally by the driver as sound (i.e., audio prompt 430) moving from left to right (RHT, FIG. 4A) or from right to left (LHT, FIG. 4B). Thus, the audio prompt 430 communicates to the driver of vehicle 100 in which direction traffic flows in the upcoming roundabout. This informs the driver in which direction to enter and traverse the roundabout. The directional sound cue is particularly intuitive to the driver if the audio prompt 430 includes virtual traffic sounds, as discussed above.

As discussed above, in some embodiments, the audio prompt 430 is played more than once (repeatedly, in some embodiments) in the manner described above (i.e., panned from first speaker 410 to second speaker 420 each time it is played and subsequently repeated) until roundabout detection module 220 detects (e.g., via map data 116 and GPS positioning data) that vehicle 100 has entered (merged into) the roundabout. In a variation of these embodiments, roundabout assistance module 230 increases the volume of the audio prompt 430 one or more times as the audio prompt 430 is repeatedly played (panned from side to side in the manner described above). For example, in one embodiment, roundabout assistance module 230 initially plays the audio prompt 430 softly and then linearly or nonlinearly increases the volume as the audio prompt 430 is repeated until a predetermined maximum volume is reached or roundabout detection module 220 detects that the vehicle has entered the roundabout, whichever occurs first.

In another embodiment, roundabout assistance module 230 increases the volume of the audio prompt 430 based on the estimated/measured distance to the roundabout obtained from roundabout detection module 220. For example, roundabout assistance module 230 can set the volume of the audio prompt 430 to be louder if vehicle 100 is closer to the roundabout than if vehicle 100 is farther away from the roundabout.

As also discussed above, in some embodiments, roundabout detection module 220 automatically determines whether the upcoming roundabout is a RHT roundabout 300 or a LHT roundabout 320 based on knowledge of the geographical region in which the vehicle 100 is currently being operated. Roundabout detection module 220 can ascertain the geographical region from a geographical-region configuration option input or selected by the vehicle owner or manufacturer, or roundabout detection module 220 can automatically detect the geographical region of operation based on GPS positioning data, depending on the embodiment. Once roundabout detection module 220 has determined the applicable geographical region, a simple table lookup reveals whether the region in question observes a RHT or LHT convention.

Figure 5:
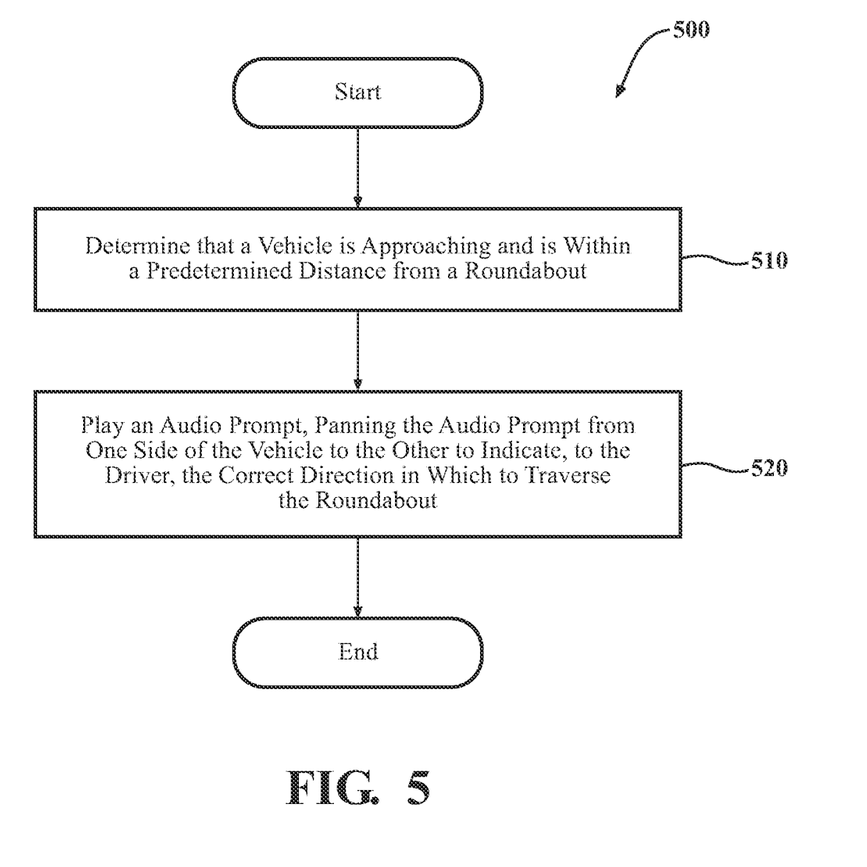
FIG. 5 is a flowchart of a method of assisting a vehicle driver at a roundabout, in accordance with an illustrative embodiment of the invention.

FIG. 5 is a flowchart of a method 500 of assisting a vehicle driver at a roundabout, in accordance with an illustrative embodiment of the invention. Method 500 will be discussed from the perspective of the roundabout assistance system 170 shown in FIG. 2. While method 500 is discussed in combination with roundabout assistance system 170, it should be appreciated that method 500 is not limited to being implemented within roundabout assistance system 170, but roundabout assistance system 170 is instead one example of a system that may implement method 500.

At block 510, roundabout detection module 220 determines that a vehicle 100 is approaching and is within a predetermined distance from a roundabout. As discussed above, how roundabout detection module 220 makes this determination varies, depending on the embodiment. In one embodiment, roundabout detection module 220 relies on map data 116 and GPS positioning data (refer to FIG. 1). In another embodiment, roundabout detection module 220 relies on information from an infrastructure system (e.g., a RSU) at the roundabout that transmits a wireless message to vehicle 100 informing vehicle 100 that the intersection ahead is a roundabout. In another embodiment, roundabout detection module 220 relies on information obtained from a cloud-based traffic-information server. In yet another embodiment, roundabout detection module 220 detects the upcoming roundabout by analyzing sensor data (e.g., images from camera(s) 126, LIDAR data, etc.) from sensor system 120. The predetermined distance can also vary, depending on the embodiment. In one embodiment, the predetermined distance is about 10 meters. In other embodiments, this distance can be increased somewhat to give the driver of vehicle 100 more time to perceive, via the audio prompt 430, the direction of traffic flow in the upcoming roundabout.

At block 520, roundabout assistance module 230 plays, in the passenger compartment of the vehicle 100 in response to determining that the vehicle 100 is approaching and is within the predetermined distance from the roundabout, an audio prompt 430 such that the audio prompt 430 is panned from a first speaker 410 on a first side of the vehicle 100 to a second speaker 420 on a second side of the vehicle 100 opposite the first side of the vehicle 100 to indicate, to the driver of vehicle 100, the correct direction in which to traverse the roundabout, thereby assisting the driver with regard to the roundabout being a RHT roundabout 300 or a LHT roundabout 320. That is, the directional audio cue helps to prevent confusion or error on the part of the driver regarding the direction in which traffic flows in the upcoming roundabout. This aids the driver in traversing the roundabout safely. As mentioned above, in some embodiments, multiple speakers can be deployed on each side of vehicle 100 to support the use of 3D audio techniques.

As discussed above, in some embodiments, the audio prompt 430 is played more than once (repeatedly, in some embodiments) in the manner described above (panned from first speaker 410 to second speaker 420 each time it is played and subsequently repeated) until roundabout detection module 220 detects (e.g., via map data 116 and GPS positioning data) that vehicle 100 has entered (merged into) the roundabout. In a variation of these embodiments, roundabout assistance module 230 increases the volume of the audio prompt 430 one or more times as the audio prompt 430 is repeatedly played and panned from side to side in the manner described above.

As also discussed above, in another embodiment, roundabout assistance module 230 increases the volume of the audio prompt 430 based on the estimated/measured distance to the roundabout obtained from roundabout detection module 220. For example, roundabout assistance module 230 can set the volume of the audio prompt 430 to be louder if vehicle 100 is closer to the roundabout than if vehicle 100 is farther away from the roundabout.

As also discussed above, in some embodiments, roundabout detection module 220 automatically determines whether the upcoming roundabout is a RHT roundabout 300 or a LHT roundabout 320 based on knowledge of the geographical region in which the vehicle 100 is currently being operated.

FIG. 1 will now be discussed in full detail as an example vehicle environment within which the systems and methods disclosed herein may be implemented. The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100. The one or more processors 110 may control some or all of these vehicle systems 140.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for assisting a vehicle driver at a roundabout, the system comprising:
   a processor; and
   a memory storing machine-readable instructions that, when executed by the processor, cause the processor to:
   determine that a vehicle is approaching and is within a predetermined distance from the roundabout; and
   play, in a passenger compartment of the vehicle in response to determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, a correct direction in which to traverse the roundabout to assist the driver with regard to the roundabout being one of a right-hand-traffic (RHT) roundabout and a left-hand-traffic (LHT) roundabout.

2. The system of claim 1, wherein the audio prompt includes virtual traffic sounds.

3. The system of claim 1, wherein:
   the roundabout is a RHT roundabout; and
   the first side of the vehicle, from a perspective of the driver, is a left side of the vehicle and the second side of the vehicle, from the perspective of the driver, is a right side of the vehicle.

4. The system of claim 1, wherein:
   the roundabout is a LHT roundabout; and
   the first side of the vehicle, from a perspective of the driver, is a right side of the vehicle and the second side of the vehicle, from the perspective of the driver, is a left side of the vehicle.

5. The system of claim 1, wherein the machine-readable instructions to play the audio prompt such that the audio prompt is panned from the first speaker on the first side of the vehicle to the second speaker on the second side of the vehicle include instructions that, when executed by the processor, cause the processor to do so repeatedly until the vehicle has entered the roundabout.

6. The system of claim 5, wherein the machine-readable instructions to play the audio prompt such that the audio prompt is panned from the first speaker on the first side of the vehicle to the second speaker on the second side of the vehicle include instructions that, when executed by the processor, cause the processor to increase the volume of the audio prompt one or more times while the audio prompt is being played repeatedly.

7. The system of claim 1, wherein the machine-readable instructions include further instructions that, when executed by the processor, cause the processor to determine automatically whether the roundabout is one of a RHT roundabout and a LHT roundabout based on a geographical region in which the vehicle is currently being operated.

8. A non-transitory computer-readable medium for assisting a vehicle driver at a roundabout and storing instructions that, when executed by a processor, cause the processor to:
   determine that a vehicle is approaching and is within a predetermined distance from the roundabout; and
   play, in a passenger compartment of the vehicle in response to determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, a correct direction in which to traverse the roundabout to assist the driver with regard to the roundabout being one of a right-hand-traffic (RHT) roundabout and a left-hand-traffic (LHT) roundabout.

9. The non-transitory computer-readable medium of claim 8, wherein the audio prompt includes virtual traffic sounds.

10. The non-transitory computer-readable medium of claim 8, wherein:
    the roundabout is a RHT roundabout; and
    the first side of the vehicle, from a perspective of the driver, is a left side of the vehicle and the second side of the vehicle, from the perspective of the driver, is a right side of the vehicle.

11. The non-transitory computer-readable medium of claim 8, wherein:
    the roundabout is a LHT roundabout; and
    the first side of the vehicle, from a perspective of the driver, is a right side of the vehicle and the second side of the vehicle, from the perspective of the driver, is a left side of the vehicle.

12. The non-transitory computer-readable medium of claim 8, wherein the instructions to play the audio prompt such that the audio prompt is panned from the first speaker on the first side of the vehicle to the second speaker on the second side of the vehicle include instructions that, when executed by the processor, cause the processor to do so repeatedly until the vehicle has entered the roundabout.

13. The non-transitory computer-readable medium of claim 12, wherein the instructions to play the audio prompt such that the audio prompt is panned from the first speaker on the first side of the vehicle to the second speaker on the second side of the vehicle include instructions that, when executed by the processor, cause the processor to increase the volume of the audio prompt one or more times while the audio prompt is being played repeatedly.

14. A method, comprising:
    determining that a vehicle is approaching and is within a predetermined distance from a roundabout; and
    playing, in a passenger compartment of the vehicle in response to the determining that the vehicle is approaching and is within the predetermined distance from the roundabout, an audio prompt such that the audio prompt is panned from a first speaker on a first side of the vehicle to a second speaker on a second side of the vehicle opposite the first side of the vehicle to indicate, to a driver of the vehicle, a correct direction in which to traverse the roundabout to assist the driver with regard to the roundabout being one of a right-hand-traffic (RHT) roundabout and a left-hand-traffic (LHT) roundabout.

15. The method of claim 14, wherein the audio prompt includes virtual traffic sounds.

16. The method of claim 14, wherein:
the roundabout is a RHT roundabout; and
the first side of the vehicle, from a perspective of the driver, is a left side of the vehicle and the second side of the vehicle, from the perspective of the driver, is a right side of the vehicle.

17. The method of claim 14, wherein:
the roundabout is a LHT roundabout; and
the first side of the vehicle, from a perspective of the driver, is a right side of the vehicle and the second side of the vehicle, from the perspective of the driver, is a left side of the vehicle.

18. The method of claim 14, wherein the playing the audio prompt such that the audio prompt is panned from the first speaker on the first side of the vehicle to the second speaker on the second side of the vehicle is repeated until the vehicle has entered the roundabout.

19. The method of claim 18, wherein the volume of the audio prompt is increased one or more times while the audio prompt is being played repeatedly.

20. The method of claim 14, the method further comprising determining automatically whether the roundabout is one of a RHT roundabout and a LHT roundabout based on a geographical region in which the vehicle is currently being operated.

* * * * *